United States Patent
Xu et al.

(10) Patent No.: US 9,792,313 B2
(45) Date of Patent: Oct. 17, 2017

(54) PARTING DATA TO IMPROVE SYSTEM PERFORMANCE

(75) Inventors: Shijie Xu, Beijing (CN); Xuefeng Song, Hebei (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 615 days.

(21) Appl. No.: 14/114,087

(22) PCT Filed: Jul. 31, 2012

(86) PCT No.: PCT/CN2012/079407
§ 371 (c)(1),
(2), (4) Date: Oct. 25, 2013

(87) PCT Pub. No.: WO2014/019133
PCT Pub. Date: Feb. 6, 2014

(65) Prior Publication Data
US 2014/0337288 A1    Nov. 13, 2014

(51) Int. Cl.
*G06F 17/30* (2006.01)
*H04L 29/08* (2006.01)

(52) U.S. Cl.
CPC .... *G06F 17/30345* (2013.01); *H04L 67/1095* (2013.01)

(58) Field of Classification Search
CPC .............. G06F 17/30345; H04L 67/1095
See application file for complete search history.

(56) References Cited

U.S. PATENT DOCUMENTS

| | | | |
|---|---|---|---|
| 5,924,092 A | 7/1999 | Johnson | |
| 7,877,358 B2 * | 1/2011 | Ritz | G06F 11/2025 707/640 |
| 2007/0198769 A1 | 8/2007 | Shin et al. | |
| 2009/0240870 A1 | 9/2009 | Kinoshita | |

(Continued)

FOREIGN PATENT DOCUMENTS

| | | |
|---|---|---|
| CN | 1975684 A | 6/2007 |
| CN | 101533335 A | 9/2009 |
| JP | 200010862 A | 1/2000 |

OTHER PUBLICATIONS

Xiaonan Zhao et al., "A Hierarchical Storage Strategy Based on Block-Level Data Valuation", Mar. 2008, IEEE 4th International Conference on Networked Computing and Advanced Information Management, pp. 36-41.*

(Continued)

*Primary Examiner* — Scott A Waldron
(74) *Attorney, Agent, or Firm* — Brundidge & Stanger, P.C.

(57) ABSTRACT

In some examples, a method is described. The method may include parting a data item into multiple data units based on update frequencies of the data units. The method may also include identifying a low update frequency data unit from amongst the data units. The method may also include determining a regional sensitive group for the low update frequency data unit based on a historical access pattern of the low update frequency data unit. The regional sensitive group may include a first host. The method may also include replicating the low update frequency data unit. The method may also include pushing the replicated low update frequency data unit to the first host.

20 Claims, 9 Drawing Sheets

| Data Units | 202 | Update Frequency | 206 | High/Low Update Frequency Data Unit | 210 | Regional Sensitive Group | 108 | Host Included In Regional Sensitive Group | 222 |
|---|---|---|---|---|---|---|---|---|---|
| First Data Unit | 202A | 0 | | Low Update Frequency Data Unit | 210A | First Regional Sensitive Group | 108A | First Host and Second Host | 102A/102B |
| Second Data Unit | 202B | 18 | | High Update Frequency Data Unit | 210B | Not Applicable | | Not Applicable | |
| Third Data Unit | 202C | 5 | | Low Update Frequency Data Unit | 210A | First Regional Sensitive Group | 108A | First Host and Second Host | 102A/102B |
| Fourth Data Unit | 202D | 7 | | Low Update Frequency Data Unit | 210A | Second Regional Sensitive Group | 108B | Third Host | 102C |
| Fifth Data Unit | 202E | 5 | | Low Update Frequency Data Unit | 210A | Second Regional Sensitive Group | 108B | Third Host | 102C |

204

(56) References Cited

U.S. PATENT DOCUMENTS

| | | | |
|---|---|---|---|
| 2011/0071988 A1 | 3/2011 | Resch et al. | |
| 2011/0185222 A1* | 7/2011 | Min | G06F 11/2074 714/6.3 |
| 2013/0054554 A1* | 2/2013 | Cao | G06F 17/30 707/706 |
| 2013/0179466 A1* | 7/2013 | Mizobuchi | G06F 17/30545 707/770 |

OTHER PUBLICATIONS

B. Allcock, et al., "Data Management and Transfer in High-Performance Computational Grid Environments", 2002, Elsevier Science, Parallel Computing, vol. 28, pp. 749-771.*

M. Shorfuzzaman, et al., "Popularity-Driven Dynamic Replica Placement in Hierarchical Data Grids", 2008, IEEE, 9th Int'l Conference on Parallel and Distributed Computing, Applications, and Technologies, pp. 524-531.*

International Search Report from corresponding International Application No. PCT/CN12/079407 mailed Aug. 16, 2012.

S. Sivasubramanian, et al., "Replication for Web Hosting Systems", ACM Computing Surveys 36(3), Sep. 2004.

M. Deris, et al., "Replicated Data Management for Transactions Sharing in Distributed Database" 2000, pp. 836-841.

T. Joseph, "Low Cost Management of Replicated Data in Fault-Tolerant Distributed Systems", ACM Transaction on Computer Systems, vol. 4, No. 1, Feb. 1, 1986, pp. 54-70.

S. Son, et al., "Replicated Data Management in Distributed Database Systems", vol. 17, No. 4, Dec. 1988, pp. 62-69.

* cited by examiner

| Data Units | 202 | Update Frequency | 206 | High/Low Update Frequency Data Unit | 210 | Regional Sensitive Group | 108 | Host Included In Regional Sensitive Group | 222 |
|---|---|---|---|---|---|---|---|---|---|
| First Data Unit | 202A | 0 | | Low Update Frequency Data Unit | 210A | First Regional Sensitive Group | 108A | First Host and Second Host | 102A/102B |
| Second Data Unit | 202B | 18 | | High Update Frequency Data Unit | 210B | Not Applicable | | Not Applicable | |
| Third Data Unit | 202C | 5 | | Low Update Frequency Data Unit | 210A | First Regional Sensitive Group | 108A | First Host and Second Host | 102A/102B |
| Fourth Data Unit | 202D | 7 | | Low Update Frequency Data Unit | 210A | Second Regional Sensitive Group | 108B | Third Host | 102C |
| Fifth Data Unit | 202E | 5 | | Low Update Frequency Data Unit | 210A | Second Regional Sensitive Group | 108B | Third Host | 102C |

*Fig. 2B*

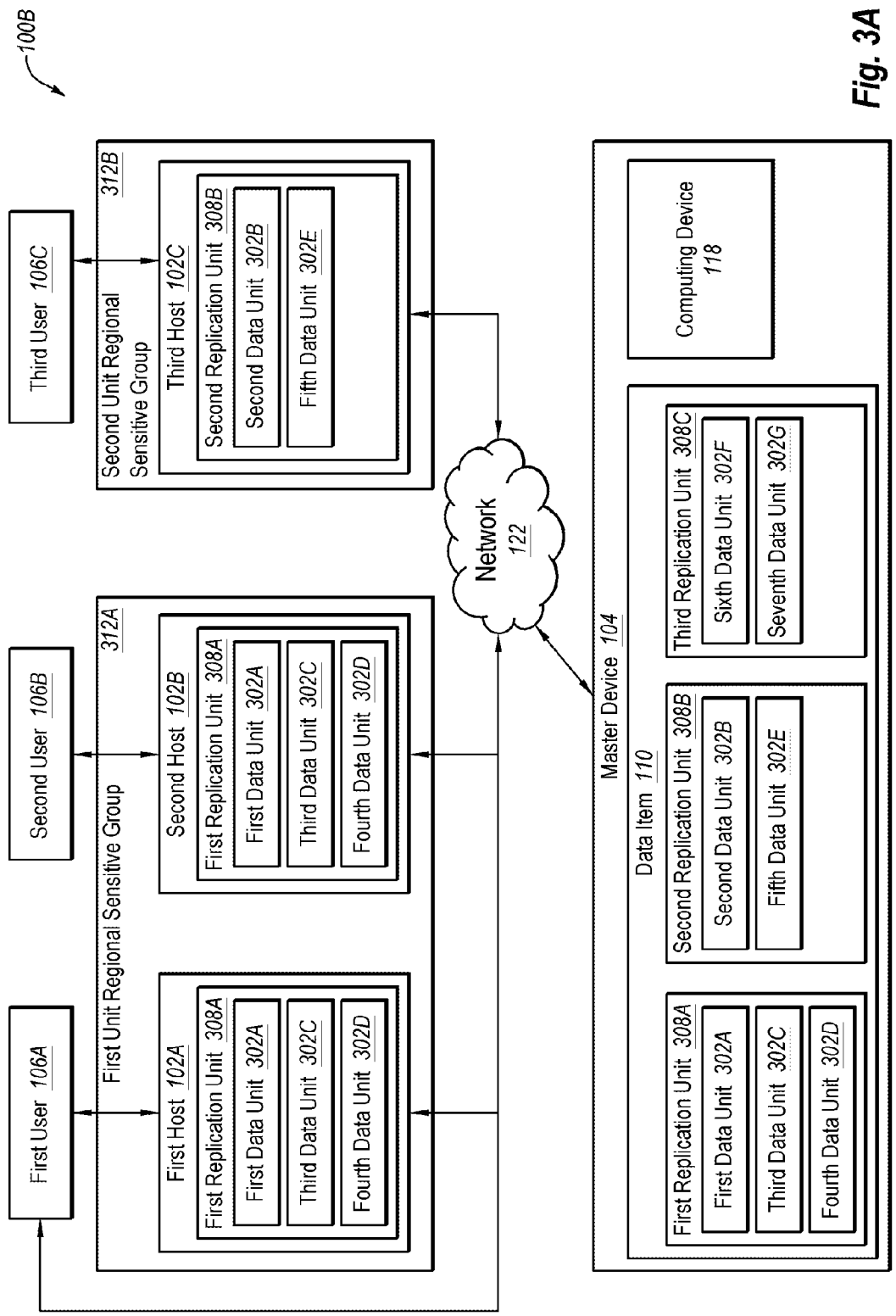

| Data Units 302 | Update Frequency 306 | Replication Unit 308 | High/Low Update Frequency Data Unit 310 | Unit Regional Sensitive Group 312 | Host Included In Regional Sensitive Group 322 |
|---|---|---|---|---|---|
| First Data Unit 302A | 0 | First Replication Unit 308A | Low Update Frequency Data Unit 310A | First Unit Regional Sensitive Group 312A | First Host and Second Host 102A/102B |
| Third Data Unit 302C | 5 | First Replication Unit 308A | Low Update Frequency Data Unit 310A | First Unit Regional Sensitive Group 312A | First Host and Second Host 102A/102B |
| Fourth Data Unit 302D | 7 | First Replication Unit 308A | Low Update Frequency Data Unit 310A | First Unit Regional Sensitive Group 312A | First Host and Second Host 102A/102B |
| Second Data Unit 302B | 12 | Second Replication Unit 308B | Low Update Frequency Data Unit 310A | Second Unit Regional Sensitive Group 312B | Third Host 102C |
| Fifth Data Unit 302E | 18 | Second Replication Unit 308B | Low Update Frequency Data Unit 310A | Second Unit Regional Sensitive Group 312B | Third Host 102C |
| Seventh Data Unit 302G | 23 | Third Replication Unit 308C | High Update Frequency Data Unit 310B | Not Applicable | Not Applicable |
| Sixth Data Unit 302F | 26 | Third Replication Unit 308C | High Update Frequency Data Unit 310B | Not Applicable | Not Applicable |

*Fig. 3B*

```
Struct Object{TableName _tableName;  Float _frequence;};

Function group(Array<Object(TableName , Float)> tables)

{List groups = new groups();
Unit unit = new Unit();
Float frequence = 0.0;

For(int I =0; i< tables.length-2;  i++){
   Object object = tables[i];
   frequence+= tables[i]._frequence;
   If(frequence>=tables[i+1]._frequence){

//Record unit update frequencies and start a new unit Unit.setFrequencies(frequence);

Groups.add(unit);
      unit= new Unit();
      frequence= tables[i]._frequence;
   }
   unit.add(tables[i]._tableName);
   fi

PARTING DATA TO IMPROVE SYSTEM PERFORMANCE

CROSS-REFERENCE TO RELATED APPLICATION

This application is a U.S. National Stage filing under 35 U.S.C. §371 of International Application No. PCT/CN12/079407, filed on Jul. 31, 2012.

BACKGROUND

Unless otherwise indicated herein, the materials described herein are not prior art to the claims in the present application and are not admitted to be prior art by inclusion in this section.

Computer systems may include multiple hosts or sites, which may be organized as a distributed system. Generally, when organized as distributed systems, data items such as tables and databases may be stored at the multiple hosts. Usually each data item is replicated and distributed to the hosts.

Users of the distributed system may modify data items stored at one of the hosts. Following modification of a data item, a modified data item may be replicated and updated at the hosts. That is, a modified version of the data item may replace a previous data item stored at the multiple hosts. The modification, replication, and updating process may be referred to as synchronizing the data item. In some distributed systems, synchronizing modified data items may constantly occur in real time. The synchronizing may incur an expense of energy and time, especially for data items that are modified frequently.

SUMMARY

Technologies described herein generally relate to data management in distributed computer systems.

In some examples, a method is described. The method may include parting a data item into multiple data units based on update frequencies of the data units. The method may also include identifying a low update frequency data unit from amongst the data units. The method may also include determining a regional sensitive group for the low update frequency data unit based on a historical access pattern of the low update frequency data unit. The regional sensitive group may include a first host. The method may also include replicating the low update frequency data unit. The method may also include pushing the replicated low update frequency data unit to the first host.

In some examples, a computer-readable storage medium having computer-readable instructions stored thereon that are executable by a computing device to perform operations is described. The operations may include parting a low update frequency data unit from multiple data units included in a data item. The operations may also include determining a regional sensitive group for the low update frequency data unit based on a historical access pattern of the low update frequency data unit. The regional sensitive group may include a subset of hosts. The operations may also include replicating the low update frequency data unit. The operations may also include pushing a replicated low update frequency data unit to the subset of hosts.

In some examples, a system is described. The system may include multiple hosts located at multiple locations and a master device that may be configured to communicate with the hosts. The master device may include a computing device and a computer-readable storage medium having stored thereon computer-readable instructions that are executable by the computing device to perform operations. The operations may include calculating update frequencies of data units included in a data item. The operations may also include determining regional sensitive groups for the data units based on historical access patterns of the data units, where each of the regional sensitive groups includes a set of the hosts. The operations may also include parting the data units into low update frequency replication units. Each of the low update frequency replication units may include a subset of the data units, each having an update frequency below a threshold, and a location list indicating a subset of the hosts common to the regional sensitive groups of the subset of data units. The operations may also include replicating the subsets of data units included in the low update frequency replication units. The operations may also include pushing the replicated subsets of data units to the subsets of the hosts.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the drawings:

FIG. 2B illustrates a first table organizing information related to parting the data units of FIG. 2A;

FIG. 3A is a block diagram illustrating an example parting of data units that may occur in the operating environment of FIG. 1;

FIG. 3B illustrates a second table organizing information related to parting the data units of FIG. 3A;

FIG. 4 illustrates an example pseudo code that may be implemented in the operating environment of FIG. 1;

DETAILED DESCRIPTION

Figure 1:
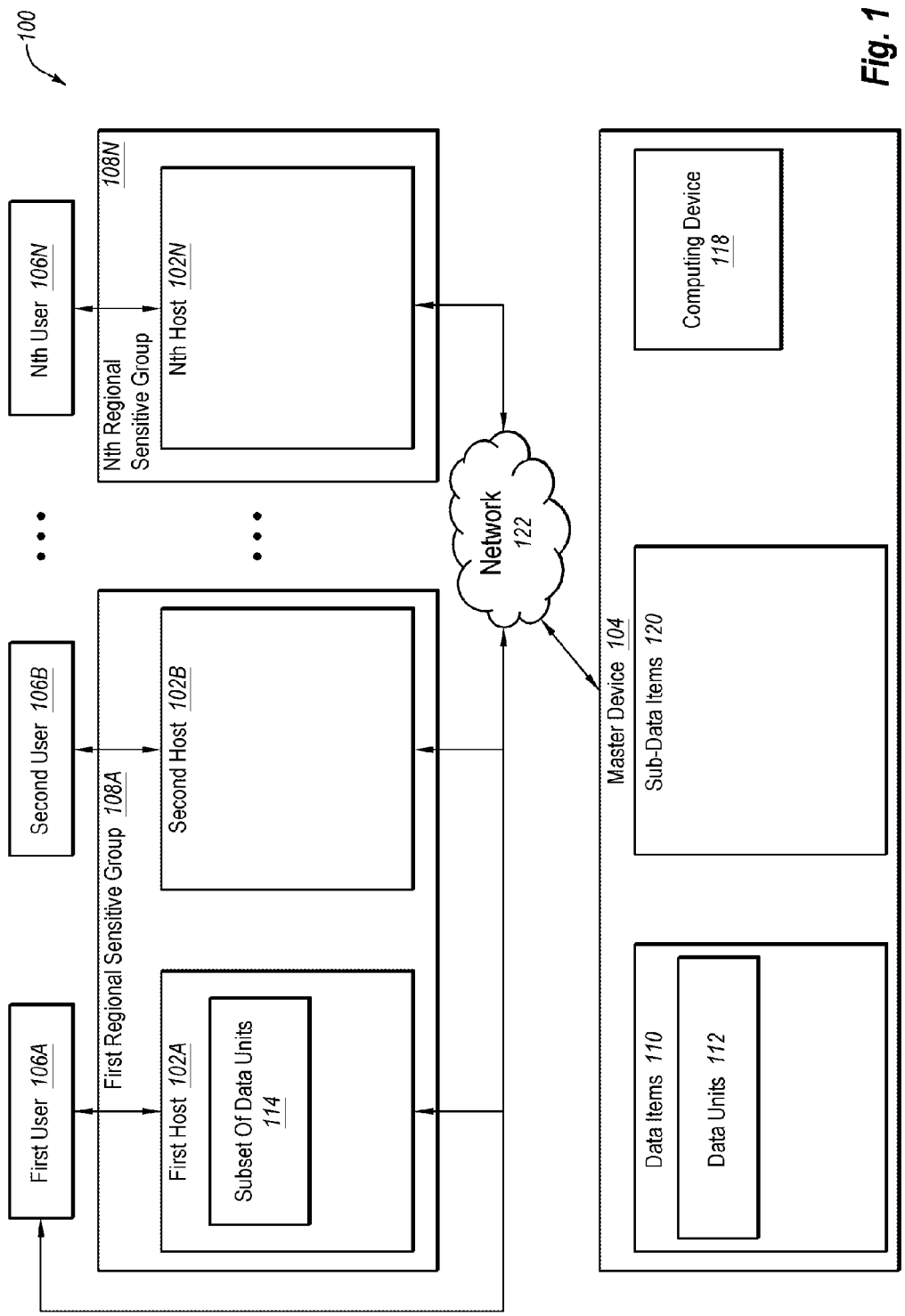
FIG. 1 is a block diagram of an example operating environment in which data may be parted.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein generally relate to an operating environment that may be arranged for parting data to improve system performance. The operating environment may include a master device and multiple hosts. A data item stored on the master device may be parted into data units. The data units may be parted according to update frequencies of the data units. The update frequency generally relates to a number of times each of the data units is typically updated or modified during a time slot window.

The master device may then replicate the data units having an update frequency below a threshold. The replicated data units may be pushed to the hosts by the master device. Users may access the replicated data units locally as provided by one of the multiple hosts. Additionally, the users may access the data units above the threshold remotely. The master device may be configured to receive write requests for the data units. When the write request is for one of the replicated data units, the master device modifies the data unit in accordance with the write request and updates the replicated data unit offline. When the write request is for one of the data units above the threshold, the master device may modify the data unit and update the data unit in real time.

FIG. 1 is a block diagram of an example operating environment 100 in which data may be parted, arranged in accordance with at least some embodiments described herein. In the illustrated embodiment, the operating environment 100 includes first, second and/or Nth hosts 102A, 102B, and 102N (generally, host or hosts 102); a master device 104; first, second and/or Nth users 106A, 106B, and 106N (generally, user or users 106); and first and/or Nth regional sensitive groups 108A and 108N (generally regional sensitive group or groups 108).

Each of the hosts 102 may include any system, apparatus, or device that enables communication between the master device 104 and/or any other of the hosts 102. Additionally, the hosts 102 may enable, at least partially, communication between the user 106 and the master device 104, between the users 106, between the user 106 and the hosts 102, or some combination thereof. The hosts 102 may be managed by the master device 104. The hosts 102 may accordingly receive input of controls signals, for instance, to govern the operation of the hosts 102. In some embodiments, the hosts 102 may include a logical entity such as a network element that receives various inputs and provides access to information in a distributed network.

The master device 104 may include any system, apparatus, or device that communicates with the hosts 102. In embodiments in which the master device 102 manages the hosts 102, the master device 104 may be a centralized storage and/or computing location. Additionally, the master device 104 may control information or portions thereof stored and/or accessible by one or more of the hosts 102 and/or one or more of the users 106. Additionally, the master device 104 may include a computing device 118. The computing device 118 may include one or more processors that may conduct or perform one or more operations, functions, etc. discussed herein.

The users 106 may include any entity such as a human, a computing system, a group of computing systems, or a business, for instance. The users 106 may interface and/or communicate with the hosts 102, with the master device 104, with the master device 104 through the hosts 102, with other users 106, or some combination thereof.

The regional sensitive groups 108 maybe associated with physical locations. A regional sensitive group 108 may include one or more hosts 102. For example, the first regional sensitive group 108A may include the first host 102A and the second host 102B. Historical access patterns of a data item or items 110 or a data unit or units 112 may be used to determine which of the hosts 102 to include in a given one of the regional sensitive groups 108. Some additional details of historical access patterns, the data items 110, and the data units 112 are discussed below.

In FIG. 1, the inclusion of the ellipses and the Nth user 106N, the Nth regional sensitive group 108N, and the Nth host 102N is meant to illustrate that the operating environment 100 may include any number of the users 106, the regional sensitive groups 108, and the hosts 102. Additionally, the hosts 102 may variously communicate with each other, and the inclusion of various ones of the hosts 102 in the regional sensitive groups 108 may vary without limitation.

The master device 104 and the hosts 102 may make up part of and/or may be communicatively coupled to a network 122. The network 122 may include one or more wide area networks (WANs) and/or local area networks (LANs) that enable communication between the master device 104, the hosts 102, the users 106, or some combination thereof. In some embodiments, the network 122 includes the Internet, including a global internetwork formed by logical and physical connections between multiple WANs and/or LANs. Alternately or additionally, the network 122 may include one or more cellular RF networks and/or one or more wired and/or wireless networks such as, but not limited to, 802.xx networks, bluetooth access points, wireless access points, IP-based networks, or the like. The network 122 may also include servers that enable one type of network to interface with another type of network. Additionally or alternatively, the network 122 may include a cloud computing environment.

The information stored on the master device 104 and/or the hosts 102, which may be accessible through the network 112, may be organized into the data items 110 and the data units 112. Generally, the data units 112 may include a parted portion of one of the data items 110. Some examples of data items 110 may include a table, a database, a combination of two or more tables, a combination of two or more databases, or a combination of one or more tables and one or more databases. For example, the data item 110 may include a database of inventory of a shoe store. In this example, the data unit 112 may include an indication of a number of slippers in the shoe store. The data items 110 and the data units 112 may be stored on the master device 104.

The master device 104 may include the data items 110. One or more of the data items 110 may be defined according to granularity. Generally, granularity of the data items 110 refers to a size of data fields in the data items 110. If the granularity of a given one of the data items 110 is fine, overhead for data input and/or data storage may increase but the flexibility of the programming related to the data item 110 may also increase.

In some embodiments, the granularity may be determined by an application category associated with each data item 110. The data items 110 included in each application category may have a common granularity. An example application category may include tables of data. The data items 110 that include a table or tables of data may be included in the corresponding application category for tables of data. A granularity of the data items 110 included in the tables of data application category may be the same and/or substantially the same.

Additionally or alternatively, one or more of the data items 110 may be sharded into one or more sub-data items 120. Generally, sharding includes applying a partitioning scheme to information in the data items 110. The data items 110 may be sharded into the sub-data items 120 according to a dimension. The dimension may include a category or a piece of information included in each data item 110. The sub-data items 120 may be treated or handled in substantially the same manner as the data items 110. That is, the sub-data items 120 may include data units 112, which may be parted, replicated, updated, etc. as described herein. For example, the data item 110 may include daily sales information. In this example, each data item 110 may be sharded to monthly sales sub-data items 120 by partitioning the data items 110 according to the dimension of months. Thus, each of the sub-data items 120 are monthly sales information in the present example.

A subset of data units 114 may be stored on one or more of the hosts 102. In FIG. 1, the subset of data units 114 is illustrated on the first host 102A, however this is not meant to be limiting. The data units 112 on the master device 104 may include all data units 112 included in all of the data items 110. However, the subset of data units 114 may include some portion of the data units 112. The data units 112 that are included in the subset of data units 114 may be determined by update frequencies of the data units 112 and/or the regional sensitive group 108, in some embodiments. Some additional details regarding the subset of data units 114 stored on one or more of the hosts 102 are provided below.

Generally, the hosts 102, the master device 104, and the network 122 enable access to and modification of the data items 110. Specifically, the network 122 may enable local read access to the subset of data units 114 at the hosts 102. For example, the first user 106A may be able to view a read-only version of the subset of data units 114 stored on the first host 102A. Such read-access may enable the first user 106A to view the read-only version of the subset of data units 114 but may prohibit the first user 106A from modifying the read-only version.

Additionally, the network 122 may enable remote read access to the data units 112 stored on the master device 104. For example, if the first user 106A wants to view one of the data units 112 that is not included in the subset of data units 114, the first user 106A may request the data unit 112 from the master device 104. The master device 104 may provide access to a read-only version of the data unit 112 to the first user 106A.

Additionally, the network 122 may enable write access to the data units 112 and the subset of data units 114. Accordingly, the master device 104 may be configured to receive a write request to write on one of the data units 112. In some embodiments, the hosts 102 may not be configured to receive write requests. Instead, the write requests may be communicated to the master device 104 even if the data unit 112 that the user 106 wishes to modify is included in the subset of data units 114 at a corresponding host 102. For example, if the first user 106A wants to modify a first data unit included in the subset of data units 114 on the first host 102A, the first user 106A may communicate a write request to the master device 104 rather than communicating the write request to the first host 102A.

When the master device 104 receives the write request for one of the data units 112 that is included in the subset of data units 114, the master device 104 may be configured to modify the data unit 112 in accordance with the write request. The master device 104 may then replicate the data unit 112 that was modified in accordance with the write request. The master device 114 may update the version of the data unit 112 included in the subset of data units 114. Updating the data unit 112 modified in accordance with the write request may occur offline. As used herein, the phrase updating the data unit 112 offline and its variants may refer to updating the data units 112 after some period of delay such that there is a period of time in which data units 112 at the hosts 102 differ from corresponding data units 112 located at the master device 104.

The master device 104 may also receive a write request for one of the data units 112 that is not included in the subset of data units 114. The data unit 112 not included in the subset of data units 114 may be stored at the master device 104. The master device 104 may be configured to modify the data unit 112 in accordance with the write request and to update the data unit 112 in real time.

Figure 2A:
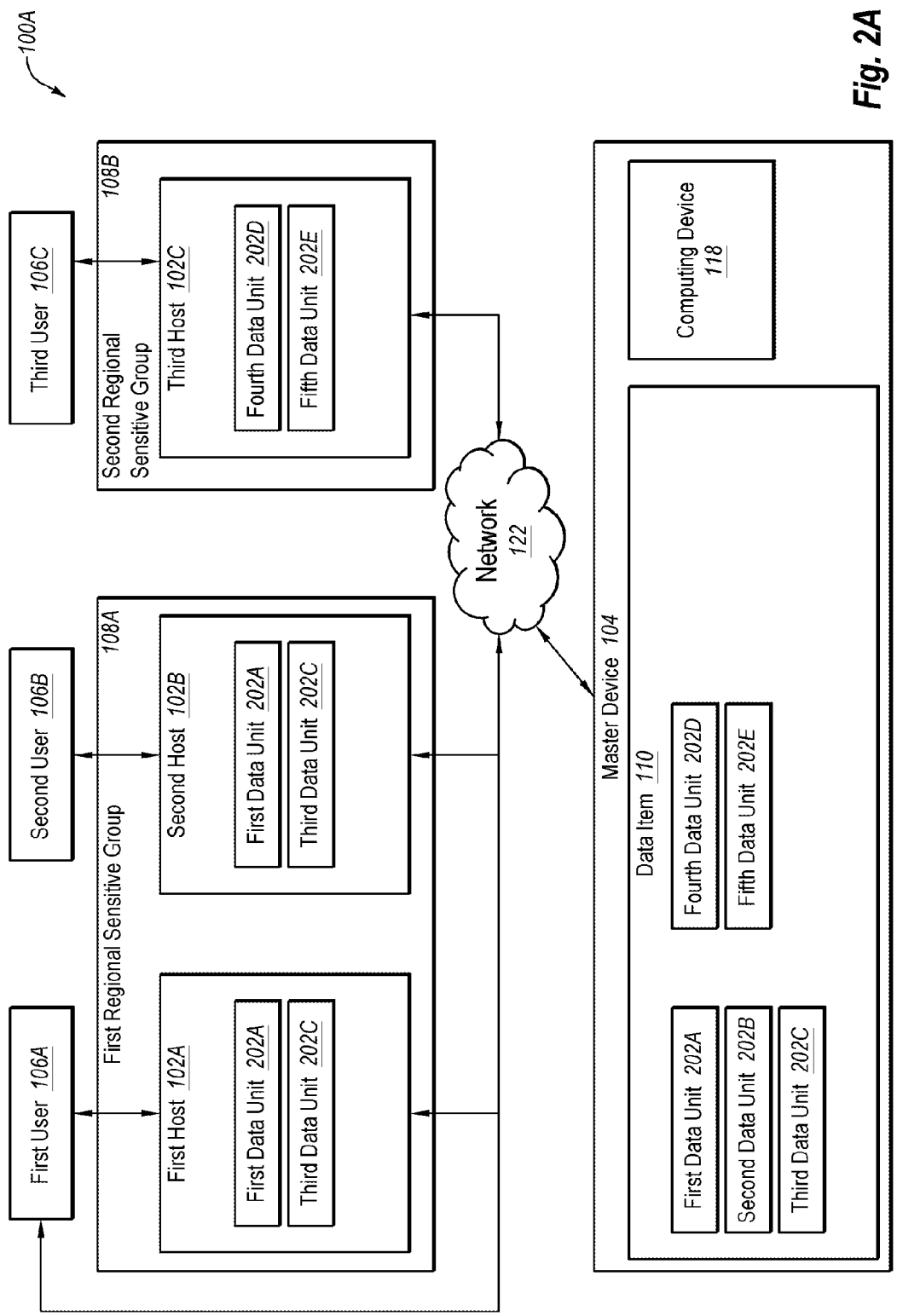
FIG. 2A is a block diagram illustrating an example parting of data units that may occur in the operating environment of FIG. 1.

FIG. 2A is a block diagram illustrating an example parting of data units 202A-202E (generally, data unit 202 or data units 202) that may occur in the operating environment 100 of FIG. 1, arranged in accordance with at least some embodiments described herein. In particular, FIG. 2A illustrates an example embodiment of the operating environment 100 of FIG. 1, denoted as operating environment 100A in FIG. 2A. The operating environment 100A depicted in FIG. 2A includes the users 106, one of the data items 110, the hosts 102, the regional sensitive groups 108, the network 122, and the master device 104 of the operating environment 100 depicted in FIG. 1. The operating environment 100A depicted in FIG. 2A includes a third user 106C, a second regional sensitive group 108B, and a third host 102C. The third user 106C is an example of the users 106, the second regional sensitive group 108B is an example of the regional sensitive groups 108, and the third host 102C is an example of the hosts 102 described with respect to the operating environment 100 of FIG. 1.

The master device 104 may partition the data item 110 into multiple data units 202. As depicted, the data item 110 may be parted into a first data unit 202A, a second data unit 202B, a third data unit 202C, a fourth data unit 202D, and a fifth data unit 202E. The data item 110 includes five data units 202, however, this is not meant to be limiting. The data item 110 may include any number of data units 202. The data units 202 may correspond to the data units 112 of FIG. 1.

The master device 104 may part the data item 110 based on update frequencies of the data units 202. The master device 104 may calculate the update frequencies for each of the data units 202. In some embodiments, the master device 104 may define a time slot window and record a number of times each of the data units 202 is updated during the time slot window. For example, the time slot window for the data item 110 may be defined as a period of time, such as, by way of example, three days. The master device 104 or another system, may then record the number of times each of the first data unit 202A, the second data unit 202B, the third data unit 202C, the fourth data unit 202D, and the fifth data unit 202E are updated during the three days.

FIG. 2B illustrates a first table 204 organizing information related to parting the data units 202 of FIG. 2A, arranged in accordance with at least some embodiments described herein. In the first table 204, a column labeled "update frequency 206" may include an indication of the number of times each of the data units 202 may have been updated during the time slot window. As depicted, the first data unit 202A may have been updated 0 times, the second data unit 202B may have been updated 18 times, the third data unit 202C may have been updated 5 times, the fourth data unit 202D may have been updated 7 times, and the fifth data unit 202E may have been updated 5 times.

From amongst the data units 202, one or more low update frequency data units may be identified. In the first table 204, a column labeled "high/low update frequency data unit 210" indicates whether each of the data units 202 is designated as a low update frequency data unit 210A or a high update frequency data unit 210B. The low update frequency data units 210A may include the data units 202 with the update frequencies 206 less than a threshold. For example, if the threshold is 1, because the first data unit 202A has been updated 0 times in the illustrated embodiment, the first data unit 202A is below the threshold. Thus, the first data unit 202A may be identified as the low update frequency data unit 210A.

Correspondingly, one or more high update frequency data units 210B may be identified from amongst the data units 202. The high update frequency data units 210B may include the data units 202 with the update frequencies 206 greater than the threshold. For example, if the threshold is 6, the second data unit 202B and the fourth data unit 202D may be identified as high update frequency data units 210B since the update frequency 206 of each of the second data unit 202B and the fourth data unit 202D is greater than 6 in the illustrated embodiment.

In the depicted embodiment, however, it is assumed that the threshold is equal to 10. The threshold of 10 is not meant to be limiting. Accordingly, the data units 202 including the update frequencies 206 less than 10 may be identified as low update frequency data units 210A. In the illustrated embodiment, the first data unit 202A, the third data unit 202C, the fourth data unit 202D, and the fifth data unit 202E may be identified as low update frequency data units 210A. The update frequency 206 of the second data unit 202B is greater than the threshold and accordingly may be identified as the high update frequency data unit 210B.

With combined reference to FIGS. 2A and 2B, the master device 104 may determine the regional sensitive group 108 for the data units 202. The regional sensitive group 108 may be determined from historical access patterns of the corresponding data unit 202. The regional sensitive group 108 may be located in or near a physical location in which one of the data units 202 is routinely accessed and/or of particular interest to one or more of the users 106. The regional sensitive group 108 may include one or more hosts 102 that are physically located in the physical location and/or accessible to users 106 in the physical location. For example, one of the data units 202 may include weather patterns of Tokyo. The regional sensitive group 108 may be located in or near Tokyo. Additionally, the regional sensitive group 108 of Tokyo may include any number of the hosts 102 located in Tokyo or accessible to users 106 in Tokyo.

In some embodiments, the regional sensitive group 108 may be determined for only the low update frequency data units 210A. Accordingly, the regional sensitive group 108 may be based on the historical access pattern of the low update frequency data units 210A. For example in the first table 204, a column labeled "Regional Sensitive Group 108" includes the regional sensitive groups 108 for each of the first data unit 202A, the third data unit 202C, the fourth data unit 202D, and the fifth data unit 202E. For the second data unit 202B, which is the high update frequency data unit 210B, the regional sensitive group 108 may be "not applicable."

As illustrated in FIGS. 2A-2B, the first regional sensitive group 108A may be determined as the regional sensitive group 108 for the first data unit 202A and the third data unit 202C. Likewise, the second regional sensitive group 108B may be determined as the regional sensitive group 108 for the fourth data unit 202D and the fifth data unit 202E. The second regional sensitive group 108B may include the third host 102C. The first regional sensitive group 108A may include the first host 102A and the second host 102B. This information is represented in the first table 204 in a column labeled "Host Included In Regional Sensitive Group 222".

The master device 104 may replicate the low update frequency data units 210A. The low update frequency data units may be replicated a specific number of times, which may be related to the number of hosts 102 in the corresponding regional sensitive group 108. For example, the first data unit 202A may be replicated two times because the first regional sensitive group 108A includes the first host 102A and the second host 102B.

The master device 104 may push replicated low update frequency data units 210A to the hosts 102 included in the corresponding regional sensitive group 108. As depicted in FIG. 2A, for instance, the first data unit 202A and the third data unit 202C may be pushed to the first host 102A and the second host 102B, which are included in the first regional sensitive group 108A. Additionally, the fourth data unit 202D and the fifth data unit 202E may be pushed to the third host 102C, which is included in the second regional sensitive group 108B.

The master device 104 may not push the second data unit 202B to any of the hosts 102 because the second data unit 202B may be identified as one of the high update frequency data units 210B. Instead, the second data unit 202B may remain at the master device 104. In some embodiments, the data units 202 including low update frequency data units 210A may also remain at the master device 104 in addition to being pushed to the corresponding hosts 102.

With combined reference to FIGS. 1 and 2A, the subset of data units 114 in FIG. 1 may correspond to the first data unit 202A and the third data unit 202C in FIG. 2A. Accordingly, the first user 106A may have local read access to the first data unit 202A and the second data unit 202B. The data units 112 in FIG. 1 may correspond to the data units 202 in FIG. 2A. Thus, the first user 106A may have remote read access to the second data unit 202B.

Additionally, the first user 106A may communicate a write request to the master device 104. If the write request is for the first data unit 202A or the third data unit 202C, modified versions of the first data unit 202A or the third data unit 202C may be updated at the first host 102A and the second host 102B offline after being updated first at the master device 104. Alternatively, if the write request is for the second data unit 202B, a modified version of the second data unit 202B may be updated in real time at the master device 104.

In some embodiments, a location list may be generated for one or more of the data units 202. The location list may indicate the hosts 102 that are included in the regional sensitive groups 108. Additionally or alternatively, the location list may indicate the hosts 102 to which one or more of the data units 202 have been pushed. The location list may be used to update modified versions of the low update frequency data units 210A. That is, when the master device 104 receives a write request for one of the low update frequency data units 210A, the master device 104 may refer to the location list to determine which of the hosts 102 to update with the modified version of the low update frequency data units 210A.

For example, with reference to FIG. 2B, the location list for the first data unit 202A may include the first host 102A and the second host 102B. When a write request is received for the first data unit 202A, the master device 104 may modify the first data unit 202A in accordance with the write request. The master device 104 may then update the version of the first data unit 202A at the hosts 102 on the location list (i.e., the first host 102A and the second host 102B in the illustrated example).

FIG. 3A is a block diagram illustrating an example parting of data units 302A-302G (generally, data unit 302 or data units 302) that may occur in the operating environment 100 of FIG. 1, arranged in accordance with at least some embodiments described herein. In particular, FIG. 3A illustrates an example embodiment of the operating environment 100 of FIG. 1, denoted as operating environment 100B in FIG. 3A. The operating environment 100B depicted in FIG. 3A includes the users 106, one of the data items 110, the hosts 102, the network 122, and the master device 104 of the operating environment 100 of FIG. 1. Similar to the operating environment 100A of FIG. 2A, the operating environment 100B of FIG. 3A includes the third user 106C, the second regional sensitive group 108B, and the third host 102C. Unlike the operating environment 100 of FIG. 1 and the operating environment 100A of FIG. 2A, the operating environment 100B of FIG. 3A may not include the regional sensitive groups 108. Instead, the operating environment 100B of FIG. 3A may include first and second unit regional sensitive groups 312A and 312B (generally, unit regional sensitive group or groups 312). Some additional details of the unit regional sensitive groups 312 are provided below.

The master device 104 may part the data item 110 into one or more data units 302. As depicted, the data item 110 may be parted into a first data unit 302A, a second data unit 302B, a third data unit 302C, a fourth data unit 302D, a fifth data unit 302E, a sixth data unit 302F, and a seventh data unit 302G. The data item 110 includes seven data units 302, however, this is not meant to be limiting. The data item 110 may include any number of data units 302. The master device 104 may part the data item 110 based on update frequencies of the data units 302. The master device 104 may calculate the update frequencies for each data unit 302 as discussed above.

FIG. 3B illustrates a second table 304 organizing information related to parting the data units 302 of FIG. 3A, arranged in accordance with at least some embodiments described herein. In the second table 304, a column labeled "update frequency 306" may include an indication of a number of times each of the data units 302 is updated during the time slot window. As depicted, the first data unit 302A may have been updated 0 times, the second data unit 202B may have been updated 12 times, the third data unit 202C may have been updated 5 times, the fourth data unit 202D may have been updated 7 times, the fifth data unit 202E may have been updated 18 times, the sixth data unit 202F may have been updated 26 times, and the seventh data unit 202G may have been updated 23 times, all during the time slot window.

Additionally the data units 302 may be sorted according to the number of times each of the data units 302 have been updated. In the second table 304, the data units 302 have been sorted in ascending order from a lowest update frequency 306 to the highest update frequency 306. In alternative embodiments, the data units 302 may be sorted in other ways.

FIG. 4 illustrates an example pseudo code 400 that may be implemented in the operating environment 100 of FIG. 1, arranged in accordance with at least some embodiments described herein. With combined reference to FIGS. 3B and 4, the pseudo code 400 may implement an algorithm that may be used to sort the data units 302 according to update frequency 306 in ascending order. Execution of the algorithm represented by the pseudo code 400 may result in the data units 302 being organized as illustrated in the second table 304 of FIG. 3B.

With specific reference to FIG. 4, the pseudo code 400 may include one or more general portions. The pseudo code 400 is written to address a set of tables that may be similar to and/or correspond to the data units 302 of FIGS. 3A and 3B, for instance. A first portion 402 may initially define variables of the pseudo code 400. One of the variables may be a "frequence" variable 408. The frequence variable 408 is related to an update frequency of one of the set of tables. A second portion 404 includes a "for loop" that addresses each table included in the set of tables. The for loop sorts the set of tables based on the frequence variable 408. A third portion 406 generates a group of the set of tables sorted in the ascending order.

Additionally or alternatively, in some embodiments, each of the set of tables may include table entries. Update frequencies for each of the table entries may be calculated as discussed elsewhere herein. The table entries may be organized within each of the set of tables in ascending order according to the update frequencies. Thus, in these and other embodiments, as the for loop sorts the set of tables based on the frequence variable 408, the update frequencies for each of the table entries may also be a consideration.

Referring again to FIGS. 3A and 3B, the master device 104 may part the data units 302 into one or more replication units 308A-308C (generally, replication unit 308 or replication units 308). The data units 302 may be parted into the replication units 308 according to update frequency ranges. For example, in the second table 304, a first replication unit 308A may be based on a first update frequency range of 0-10. A second replication unit 308B may be based on a second update frequency range of 11-20. A third replication unit 308C may be based on a third update frequency range of 21-30. The replication units 308 may include one or more of the data units 302 including update frequencies 306 within the corresponding update frequency range. For example, in the second table 304, the first replication unit 308A may include the first data unit 302A, the third data unit 302C, and the fourth data unit 302D; the second replication unit 308B may include the second data unit 302B and the fifth data unit 302E; and the third replication unit 308C may include the seventh data unit 302G and the sixth data unit 302F.

Additionally, in some embodiments, the master device 104 may part the replication units 308 according to a threshold. The replication units 308 including update frequency ranges above the threshold may be designated as high update frequency replication units. Similarly, the replication units 308 that include update frequency ranges below the threshold may be designated as low update frequency replication units.

In the second table 304, a column labeled "high/low update frequency replication unit 310" may indicate whether the replication units 308 are high update frequency replication units 310B or low update frequency replication units 310A. For example, in the second table 304, a threshold between low update frequency replication data units 310A and high update frequency data units 310B may be 20, or other suitable threshold. Accordingly, the low update frequency replication units 310A may include the first replication unit 308A and the second replication unit 308B. The high update frequency replication units 310B may include the third replication unit 308C.

The master device 104 may determine the unit regional sensitive groups 312 for the replication units 308. Additionally or alternatively, the master device 104 may determine regional sensitive groups 108 discussed with reference to FIGS. 1, 2A, and 2B for the data units 302 included in the replication units 308. The determination of the unit regional sensitive groups 312 may be based on the historical access pattern of the data units 302 included in the replication units 308.

The unit regional sensitive group 312 may include one or more physical locations in which the one or more data units 302 included in the replication unit 308 are routinely accessed and/or of particular interest to one or more of the users 106. In some embodiments, the unit regional sensitive group 312 may include the hosts 102 that the two or more data units 302 have in common. In alternative embodiments, the unit regional sensitive group 312 may include a combination of the hosts 102 in the physical locations of all the data units 302 included in the replication unit 308.

For example in the second table 304, a column labeled "Unit Regional Sensitive Group 312" includes the unit regional sensitive groups 312 for the first replication unit 308A and the second replication unit 308B. For the third replication unit 308C, which is the high update frequency replication unit 310B, the unit regional sensitive group 312 may be "not applicable."

In the second table 304, a column labeled "Host Included in Unit Regional Sensitive Group" 322 may indicate which of the hosts 102 are included in each of the unit regional sensitive groups 312. For example, the first host 102A and the second host 102B may be included in the first unit regional sensitive group 312A. The third host 102C may be included in the second regional sensitive group 312B.

One or more of the data units 302 may be replicated by the master device 104. In some embodiments, only the data units 302 included in the low update frequency replication units 310A may be replicated by the master device 104. The number of replications may be determined by the number of hosts 102 included in the corresponding unit regional sensitive group 312 such that each of the hosts 102 included in the corresponding unit regional sensitive group 312 may receive one of the replications. For example, for the first replication unit 308A, a first replication of the first data unit 302A and a second replication of the first data unit 302A may be replicated from the first data unit 302A. In this and other embodiments, the data units 302 included in the high update frequency replication units 310B may not be replicated.

Referring to FIG. 3A, the master device 104 may push the data units 302 included in the low update frequency replication units 310A to the hosts 102 included in the corresponding unit regional sensitive group 312. For example, the master device 104 may push the first data unit 302A, the third data unit 302C, and the fourth data unit 302D, which may be included in the first replication unit 308A, to the first host 102A and the second host 102B. Likewise, the master device 104 may push the second data unit 302B and the fifth data unit 302E to the third host 102C. The data units 302 included in the high update frequency replication units 310B may not be pushed to the hosts 102. Instead, high update frequency replication units 310B may remain at the master device 104.

Alternatively, in some embodiments, the data units 302 included in the low update frequency replication units 310A may be pushed to all the hosts 302. In these and other embodiments, the master device 104 may not determine the unit regional sensitive group 312, for instance.

With combined reference to FIGS. 1 and 3A, the subset of data units 114 in FIG. 1 may correspond to the data units 302 included in the first replication unit 308A (i.e., the first data unit 302A, the third data unit 302C, and the fourth data unit 302D) in FIG. 3A. Accordingly, the first user 106A may have local read access to the data units 302 included in the first replication unit 308A.

The data units 112 in FIG. 1 may correspond to the data units 302 included in the master device 104 in FIG. 3A. That is, the data units 112 in FIG. 1 may correspond to the data units 302 included in the first replication unit 308A, the second replication unit 308B, and the third replication unit 308C. Thus, the first user 106A may have remote read access to the data units 302 included in the second replication unit 308B and the third replication unit 308C.

Additionally, the first user 106A may communicate a write request to the master device 104. If the write request is for one of the data units 302 included in the first replication unit 308A, the master device 104 may modify the data unit 302 included in the first replication unit 308A in accordance with the write request. The master device 104 may additionally update the data unit 302 at the first host 102A and the second host 102B offline. Alternatively, if the write request is for one of the data units 302 included in the third replication unit 308C, the master device 104 may modify the data unit 302 included in the third replication unit 308C in accordance with the write request. However, the master device 104 may update the data unit 302 included in the third replication unit 308C in real time.

Alternatively still, if the write request is for one of the data units 302 included in the second replication unit 308B, the master device 104 may update the data unit 302 included in the second replication unit 308B offline or in real time. Additionally, the operating environment 100B of FIG. 3A may be constructed such that the first user 106A rarely modifies the data units 302 included in the second replication unit 308B. In some embodiments, a write request from the first user 106A for one of the data units 302 included in the second replication unit 308B may trigger the master device 104 to re-assess the regional sensitive groups 108 for the data units 302 and/or the unit regional sensitive groups 312 for the replication units 308.

In some embodiments, the master device 104 may define a replication rule for each of the replication units 308. The replication rules may be defined for each of the high update frequency replication units 310B and/or for each of the low update frequency replication units 310A. The replication rules may define how the data units 302 included in each of the replication units 308 are updated.

In some embodiments, the master device 104 may generate location lists for one or more of the data units 302. The location lists may indicate the hosts 102 that are included in the unit regional sensitive groups 312. That is, each location list may indicate the hosts 102 common to regional sensitive groups 108 of the one or more data units 302 included in one of the replication units 308. For example, if two of the data units 302 are included in one of the replication units 308, but the regional sensitive groups 108 for the two data units 302 are different, then the location list for the two data units 302 may include the hosts 102 common to the regional sensitive groups 108. The location lists may further indicate to which hosts 102 the data unit(s) 302 are pushed.

Figure 5:
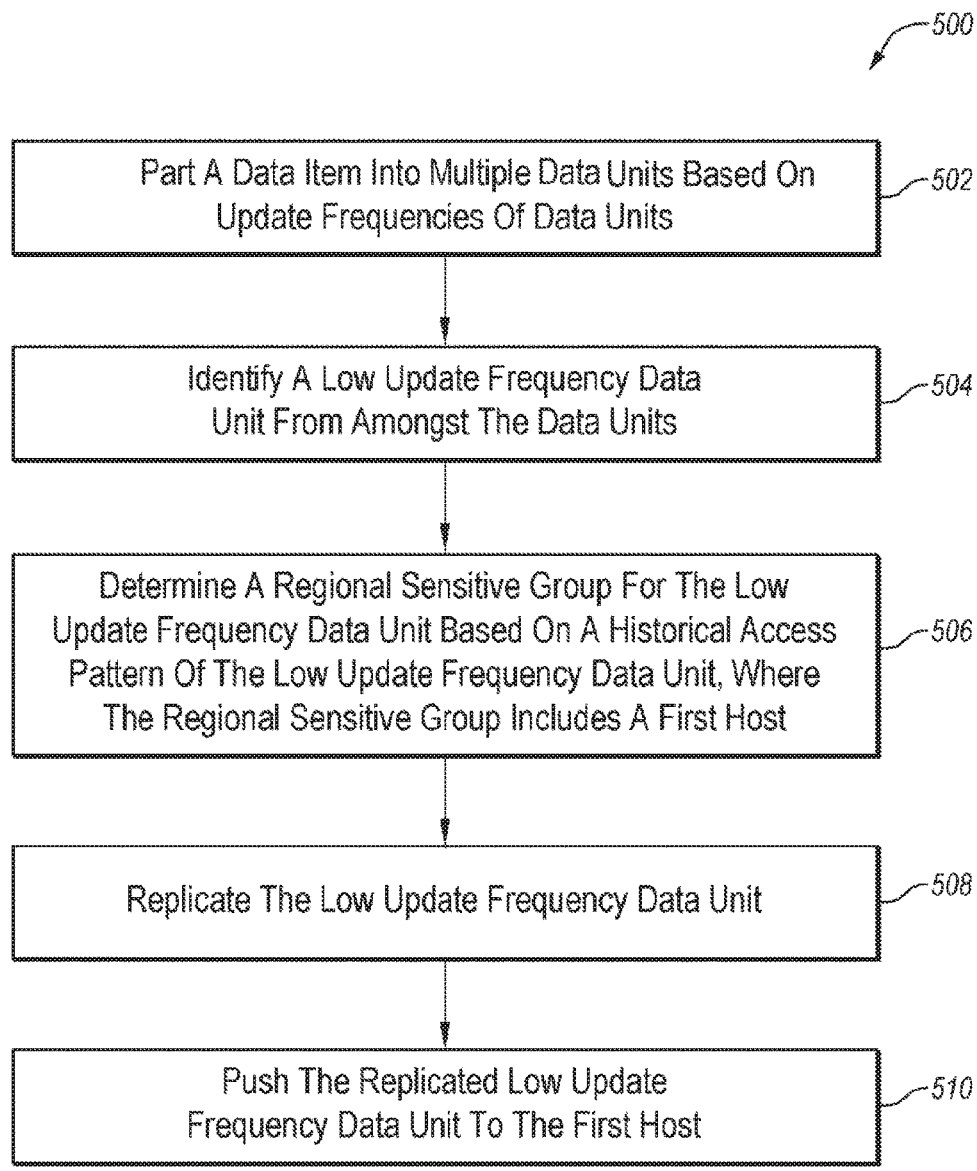
FIG. 5 shows a flow diagram of an example method for parting data to improve system performance.

FIG. 5 shows a flow diagram of an example method 500 for parting data to improve system performance, arranged in accordance with at least some embodiments described herein. The method 500 may be performed in whole or in part by, e.g., the master device 104 of FIG. 1, or more particularly by the computing device 118. The method 500 includes various operations, functions, or actions as illustrated by one or more of blocks 502, 504, 506, 508, and/or 510. The method may begin at block 502.

In block 502 ("Part a Data Item Into Multiple Data Units Based On Update Frequencies Of The Data Units"), a data item may be parted into multiple data units. The data item may be parted into the multiple data units based on update frequencies of the multiple data units. In some embodiments, parting the data item may include calculating the update frequencies of the multiple data units by defining a time slot window and recording a number of times each of the multiple data units is updated during the time slot window. Block 502 may be followed by block 504.

In block 504 ("Identify a Low Update Frequency Data Unit From Amongst The Data Units"), a low update frequency data unit may be identified. More specifically, the low update frequency data unit may be identified from amongst the data units. Block 504 may be followed by block 506.

In block 506 ("Determine A Regional Sensitive Group For The Low Update Frequency Data Unit Based On A Historical Access Pattern Of The Low Update Frequency Data Unit, Where The Regional Sensitive Group Includes A First Host"), a regional sensitive group of data for the low update frequency data unit may be determined. The regional sensitive group may be determined based on a historical access pattern of the low update frequency data unit. The regional sensitive group may include a first host. Block 506 may be followed by block 508.

In block 508 ("Replicate The Low Update Frequency Data Unit"), the low update frequency data unit may be replicated. Block 508 may be followed by block 510.

In block 510 ("Push The Replicated Low Update Frequency Data Unit To The First Host"), the replicated low update frequency data unit may be pushed to the first host.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 500 may include receiving a write request for the low update frequency data unit. In accordance with the write request, the low update frequency data unit may be modified. The replicated low update frequency data unit may then be updated at the first host offline.

Additionally or alternatively, the method 500 may include identifying a high update frequency data unit. The high update frequency data unit may have an update frequency above a threshold, for instance. The method 500 may further include receiving a write request for the high update frequency data unit. The high update frequency data may be modified in accordance with the write request. The high update frequency data unit may be updated in real time.

Additionally or alternatively, the method 500 may include defining the data item according to data granularity. The data granularity maybe determined by an application category. In some embodiments, the application category includes a table, a database, a combination of two or more tables, a combination of two or more databases, or a combination of one or more tables and one or more databases. In some embodiments, the data item may be sharded into multiple sub-data items according to a dimension. The data item may be sharded prior to parting the data item into the multiple data units.

Additionally or alternatively, the method 500 may include parting the data item into multiple replication units according to update frequency ranges. In some embodiments, the replication units include a subset of data units having an update frequency within one of the update frequency ranges. For the replication units having an update frequency range below a threshold, a unit regional sensitive group may be determined. The unit regional sensitive group may include a set of hosts. In addition, a location list may be generated indicating the set of hosts included in the unit regional sensitive group. The method 500 may additionally include pushing the subset of data units to the set of hosts.

Figure 6:
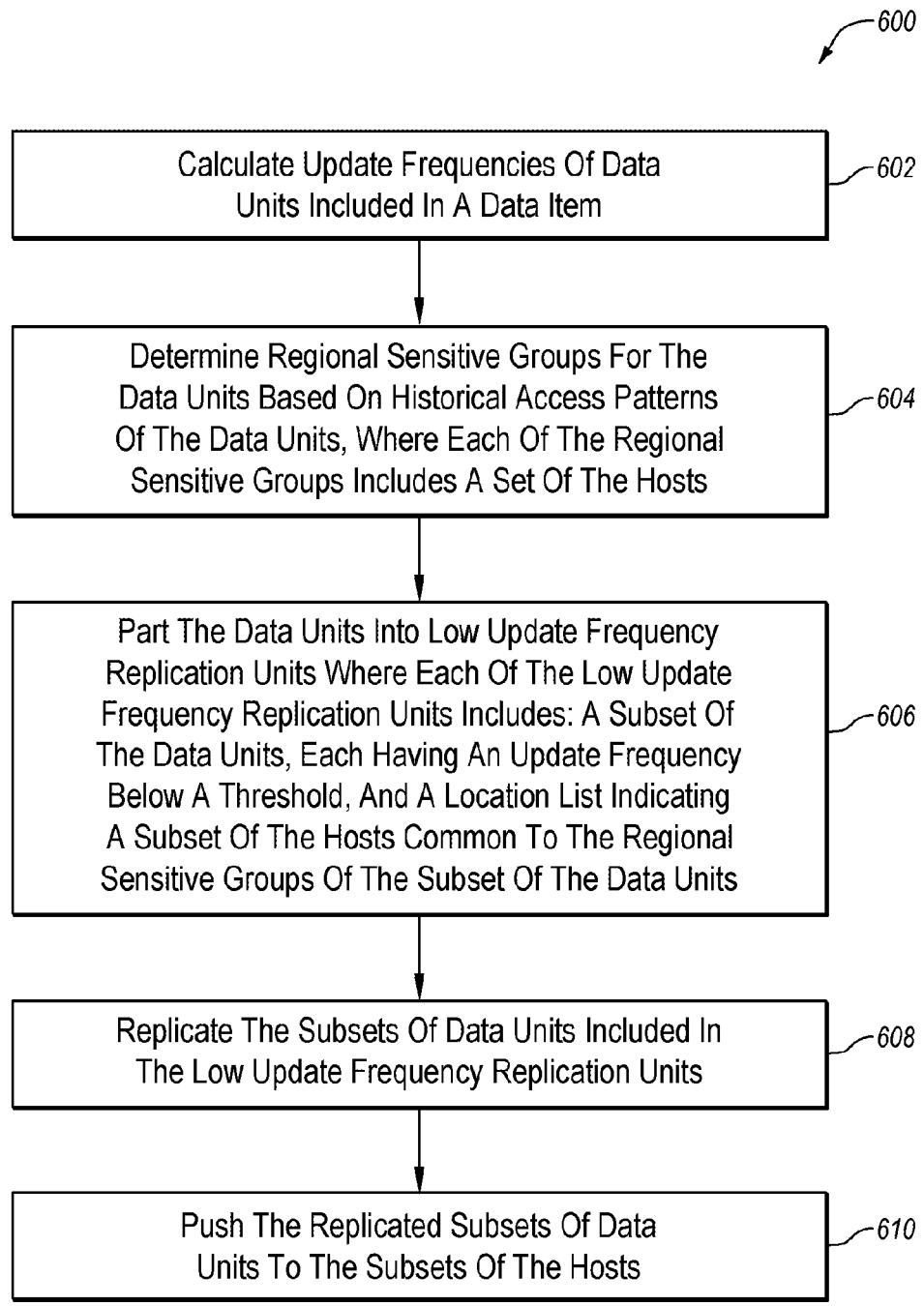
FIG. 6 shows a flow diagram of an example method for parting data into replication units.

FIG. 6 shows a flow diagram of an example method 600 for parting data into replication units, arranged in accordance with at least some embodiments described herein. The method 600 may be performed in whole or in part by, e.g., the master device 104 of FIG. 1, or more particularly by the computing device 118. The method 600 includes various operations, functions, or actions as illustrated by one or more of blocks 602, 604, 606, 608, and/or 610. The method 600 may begin at block 602.

In block 602 ("Calculate Update Frequencies Of Data Units Included In A Data Item"), update frequencies of data units included in a data item may be calculated. Block 602 may be followed by block 604.

In block 604 ("Determine Regional Sensitive Groups For The Data Units Based On Historical Access Patterns Of The Data Units, Where Each Of The Regional Sensitive Groups Includes A Set Of Hosts"), regional sensitive groups may be determined for the data units. The regional sensitive groups may be based on historical access patterns of the data units. In some embodiments, each of the regional sensitive groups includes a set of multiple hosts. Block 604 may be followed by block 606.

In block 606 ("Part The Data Units Into Low Update Frequency Replication Units, Where Each Of The Low Update Frequency Replication Units Includes: A Subset Of The Data Units, Each Having An Update Frequency Below A Threshold, And A Location List Indicating A Subset Of The Hosts Common To The Regional Sensitive Groups Of The Subset Of Data Units"), the data units may be parted into low update frequency replication units. Each of the low update frequency replication units may include a subset of the data units. Each of the subset of the data units may include an update frequency below a threshold. Additionally, each of the subset of the data units may include a location list that may indicate a subset of multiple hosts common to the regional sensitive groups of the subset of data units.

In some embodiment, the data units may be parted into high update frequency replication units. Each of the high update frequency replication units may include a subset of the data units. The subset of data units included in the high update frequency replication units may have an update frequency above the threshold. Block 606 may be followed by block 608.

In block 608 ("Replicate The Subsets Of Data Units Included In The Low Update Frequency Replication Units"), the data units included in the low update frequency replication units may be replicated. Block 608 may be followed by block 610.

In block 610 ("Push The Replicated Subsets Of Data Units To The Subsets Of The Hosts"), the replicated subsets of data units may be pushed to the subsets of the multiple hosts.

Alternatively or additionally, the method 600 may include defining a replication rule for each of the high update frequency replication units and for each of the low update frequency replication units. The subsets of data units included in each of the high update frequency replication units and low update frequency replication units may be updated according to the corresponding replication rule.

In some embodiments, the hosts and/or a master device may be configured to provide various read access and write access. For example, the hosts may be configured to enable local read access to data units pushed thereto. Additionally or alternatively, the master device is configured to enable remote read access to the data item and to receive a write request to write on one of the data units. When the write request is for a data unit included in one or more of the low update frequency replication units, the master device may be configured to modify the data unit in accordance with the write request and to update a replicated data unit at the subset of the hosts offline. When the write request is received for a data unit included in one or more of the high update frequency replication units, the master device may be configured to update the data unit in real time.

Some embodiments disclosed herein include a computer-readable storage medium having computer-readable instructions stored thereon that are executable by a computing device to perform operations included in the method 500 of FIG. 5, such as the operations illustrated by one or more of blocks 502-510 in FIG. 5, and/or variations thereof. Additionally or alternatively, the computing device may perform operations included in the method 600 of FIG. 6, such as the operations illustrated by one or more of the blocks 602-610, and/or variations thereof. The computer-readable storage medium may be included in the master device 104 and/or the computing device 118 of FIG. 1, for example.

Figure 7:
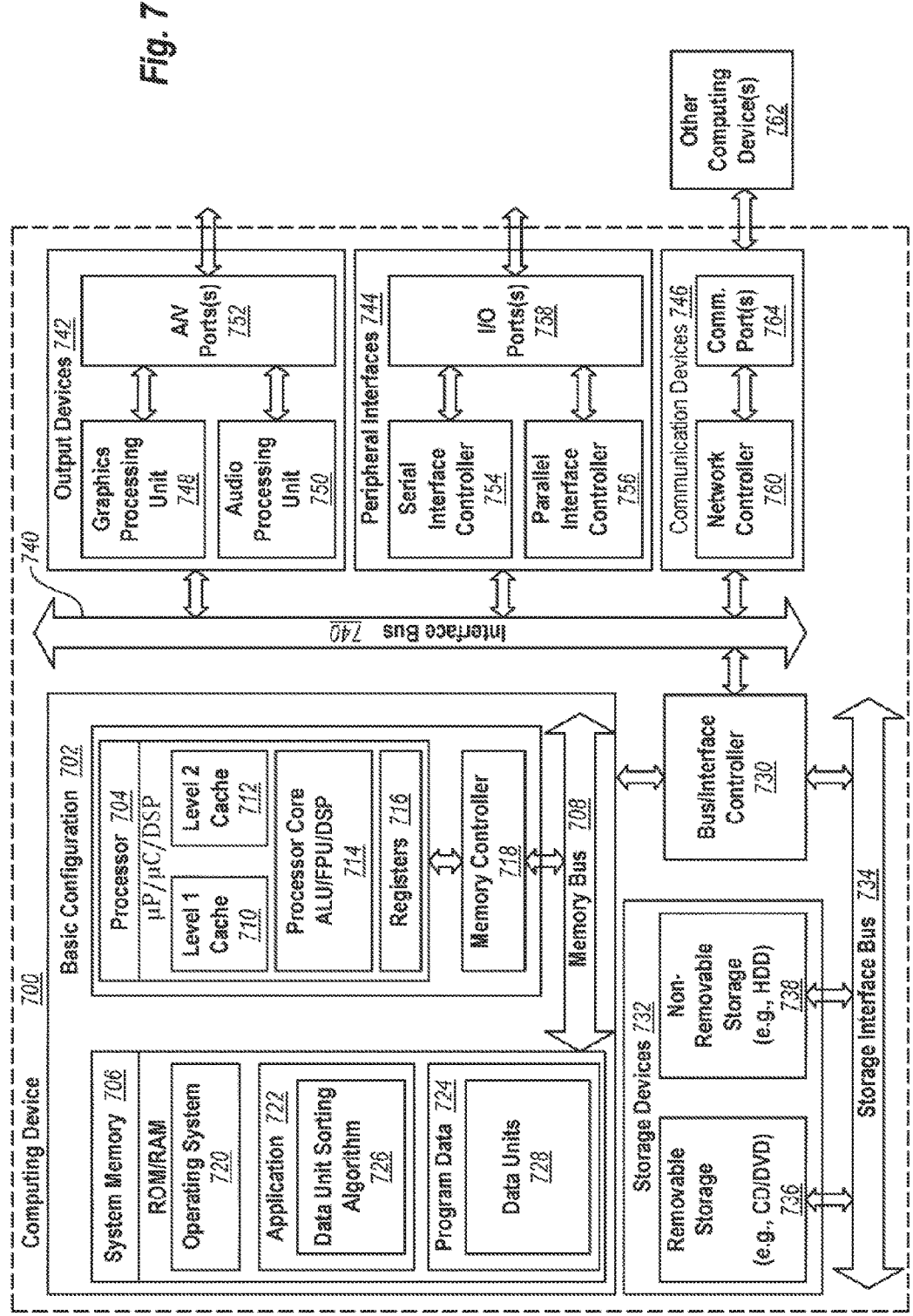
FIG. 7 is a block diagram illustrating an example computing device that is arranged for parting data to improve system performance, all arranged in accordance with at least some embodiments described herein.

FIG. 7 is a block diagram illustrating an example computing device 700 that is arranged for parting data to improve system performance, arranged in accordance with at least some embodiments described herein. The computing device 700 may be included in the master device 104 of FIG. 1, for example. In a very basic configuration 702, the computing device 700 typically includes one or more processors 704 and a system memory 706. A memory bus 708 may be used for communicating between the processor 704 and the system memory 706.

Depending on the desired configuration, the processor 704 may be of any type including but not limited to a microprocessor (μP), a microcontroller (μC), a digital signal processor (DSP), or any combination thereof. The processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP core), or any combination thereof. An example memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an OS 720, one or more applications 722, and program data 724. The application 722 may include a data unit sorting algorithm 726 that is arranged to perform the functions as described herein including those described with respect to the pseudo code 400 of FIG. 4. The program data 724 may include one or more data units 728 that may be parted or otherwise operated on by, e.g., the data unit sorting algorithm 726 as is described herein. In some embodiments, the application 722 may be arranged to operate with the program data 724 on the OS 720 such that methods for parting data such as the methods 500 and 600 of FIGS. 5 and 6 may be provided as described herein. This described basic configuration 702 is illustrated in FIG. 7 by those components within the inner boxed area.

The computing device 700 may have additional features or functionality, and additional interfaces to facilitate communications between the basic configuration 702 and any required devices and interfaces. For example, a bus/interface controller 730 may be used to facilitate communications between the basic configuration 702 and one or more data storage devices 732 via a storage interface bus 734. The data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, removable storage devices 736, and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., output devices 742, peripheral interfaces 744, and communication devices 746) to the basic configuration 702 via the bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 700 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method comprising:
    parting a data item into a plurality of data units based on an update frequency of each of the plurality of data units within the data item during a time slot window;

identifying a low update frequency data unit from amongst the plurality of data units based on historical access patterns of the plurality of data units;

determining a regional group, which includes a plurality of hosts, wherein each host is coupled to one another by a computer network and located within a particular distance of a geographical location, wherein the regional group is determined for the low update frequency data unit based on routine user access and/or particular user interest associated with the geographical location, and wherein the plurality of hosts include a first host;

replicating the low update frequency data unit; and pushing the replicated low update frequency data unit to the first host.

2. The method of claim 1, further comprising:

receiving a write request for the low update frequency data unit;

in accordance with the write request, modifying the low update frequency data unit; and updating the replicated low update frequency data unit at the first host offline.

3. The method of claim 2, further comprising:

identifying a high update frequency data unit from amongst the plurality of data units;

receiving another write request for the high update frequency data unit; and in accordance with the another write request, updating the high update frequency data unit in real time.

4. The method of claim 1, further comprising calculating the update frequency of each of the plurality of data units, wherein the parting the data item into the plurality of data units is based on the calculated update frequency of each of the plurality of data units.

5. The method of claim 4, wherein the calculation of the update frequency of each of the plurality of data units comprises:

defining the time slot window; and recording a number of times each of the plurality of data units is updated during the defined time slot window.

6. The method of claim 1, further comprising:

defining the data item according to data granularity, wherein the data granularity is determined by an application category.

7. The method of claim 6, wherein the application category comprises one of:

a table, a database, a combination of two or more tables, a combination of two or more databases, or a combination of one or more tables and one or more databases.

8. The method of claim 1, further comprising:

prior to parting the data item into the plurality of data units, sharding the data item into a plurality of sub-data items according to a dimension.

9. The method of claim 1, further comprising:

parting the plurality of data units into a plurality of replication units according to update frequency ranges, wherein each of the plurality of replication units includes a subset of the plurality of data units having an update frequency within one of the update frequency ranges; and for each of the plurality of replication units having an update frequency range below a threshold:

determining a unit regional group which includes a set of hosts, generating a location list that indicates the set of hosts included in the unit regional group, and pushing the subset of the plurality of data units to the set of hosts.

10. A non-transitory computer-readable storage medium having computer-readable instructions stored thereon that are executable by a computing device to perform operations comprising:

parting a low update frequency data unit from a plurality of data units included in a data item based on a historical access pattern of the plurality of data units;

determining a regional group for the low update frequency data unit based on the historical access pattern of the plurality of data units, wherein the regional group includes a subset of hosts, wherein each host is coupled to one another by a computer network and within a particular distance of a geographical location, and wherein the regional group is determined for the low update frequency data unit based on routine user access and/or particular user interest associated with the geographical location;

replicating the low update frequency data unit; and pushing the replicated low update frequency data unit to the subset of hosts.

11. The non-transitory computer-readable storage medium of claim 10, wherein the operations further comprise:

receiving a write request for a data unit included in the plurality of data units;

in accordance with the write request, modifying the data unit;

in response to a determination that the modified data unit includes the low update frequency data unit, updating the replicated low update frequency data unit at the subset of hosts offline; and in response to the modified data unit including a data unit other than the low update frequency data unit, updating the data unit in real time.

12. The non-transitory computer-readable storage medium of claim 10, wherein the low update frequency data unit includes one of the plurality of data units with an update frequency of less than a threshold.

13. The non-transitory computer-readable storage medium of claim 10, wherein the operations further comprise:

calculating an update frequency of each of the plurality of data units, wherein the calculation of the update frequency for each of the plurality of data units includes:

defining a time slot window, and recording a number of times a corresponding data unit is updated during the defined time slot window; and parting the data item into the plurality of data units further based on the calculated update frequency of each of the plurality of data units.

14. A system, comprising:

a plurality of hardware processor-based hosts located at a plurality of locations, wherein each hardware processor-based host is coupled to one another by a computer network; and a master device comprising a hardware processor and configured to communicate with the plurality of hardware processor-based hosts, wherein the master device includes a computing device that comprises the hardware processor and a computer-readable storage medium having stored thereon computer-readable instructions that are executable by the computing device to perform operations to:

calculate update frequencies of data units included in a data item, determine regional groups for the data units based on historical access patterns of the data units, wherein each of the regional groups includes a set of the plurality of hardware processor-based hosts, wherein each hardware processor-based host is located within a particular distance of a geographical location, and wherein the regional groups are determined for a low update frequency data unit based on routine user access and/or particular user interest associated with the geographical location, part the data units into low update frequency replication units based on the historical access patterns of the data units, wherein each of the low update frequency replication units includes:
   a subset of the data units, each having an update frequency below a threshold, and
   a location list that indicates a subset of the plurality of hardware processor-based hosts common to the regional groups of the subset of the data units, replicate the subset of the data units included in the low update frequency replication units, and push the replicated subset of the data units to the subset of the plurality of hardware processor-based hosts.

15. The system of claim 14, wherein the operations further comprise:
part the data units into high update frequency replication units, wherein each of the high update frequency replication units includes a subset of the data units, each having an update frequency above the threshold.

16. The system of claim 15, wherein the operations further comprise:

define a replication rule for each of the high update frequency replication units and for each of the low update frequency replication units; and update the subset of the data units included in each of the high update frequency replication units and the low update frequency replication units according to the corresponding replication rule.

17. The system of claim 14, wherein each of the plurality of hardware processor-based hosts is configured to enable local read access to the replicated subset of the data units pushed thereto.

18. The system of claim 17, wherein the master device is configured to enable remote read access to the data item and to receive a write request to write on one of the data units.

19. The system of claim 18, wherein:
the master device is configured to modify the data unit in accordance with the write request and to update a replicated data unit at the subset of the plurality of hardware processor-based hosts offline in response to a determination that the write request is for the data unit included in one or more of the low update frequency replication units.

20. The system of claim 19, wherein:
the master device is configured to update the data unit in real time in response to a determination that a write request is received for the data unit included in one or more of the high update frequency replication units.

* * * * *